(12) United States Patent
Choi et al.

(10) Patent No.: US 12,530,584 B2
(45) Date of Patent: Jan. 20, 2026

(54) METHOD AND APPARATUS FOR ENCODING/DECODING DEEP LEARNING NETWORK

(71) Applicant: Korea Electronics Technology Institute, Seongnam-si (KR)

(72) Inventors: Byeong Ho Choi, Seoul (KR); Sang Seol Lee, Gwangju-si (KR); Sung Joon Jang, Seongnam-si (KR); Sung Jei Kim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 834 days.

(21) Appl. No.: 17/784,862

(22) PCT Filed: Nov. 30, 2020

(86) PCT No.: PCT/KR2020/017270
§ 371 (c)(1),
(2) Date: Jun. 13, 2022

(87) PCT Pub. No.: WO2021/118140
PCT Pub. Date: Jun. 17, 2021

(65) Prior Publication Data
US 2023/0010859 A1    Jan. 12, 2023

(30) Foreign Application Priority Data
Dec. 11, 2019   (KR) .................. 10-2019-0164757

(51) Int. Cl.
*G06N 3/082* (2023.01)
*G06N 3/0495* (2023.01)

(52) U.S. Cl.
CPC ........... *G06N 3/082* (2013.01); *G06N 3/0495* (2023.01)

(58) Field of Classification Search
CPC ............................ G06N 3/082; G06N 3/0495
See application file for complete search history.

(56) References Cited

U.S. PATENT DOCUMENTS

2019/0197420 A1   6/2019  Singh et al.
2021/0136394 A1*  5/2021  Sakamoto ............ H04N 19/186

FOREIGN PATENT DOCUMENTS

KR    10-2018-0013674 A    2/2018
KR    10-2018-0052069 A    5/2018
(Continued)

OTHER PUBLICATIONS

Pal, Chandrajit, et al. "Modified Huffman based compression methodology for deep neural network implementation on resource constrained mobile platforms." 2018 IEEE International Symposium on Circuits and Systems (ISCAS). IEEE, 2018. (Year: 2018).*
(Continued)

*Primary Examiner* — Eric Nilsson
(74) *Attorney, Agent, or Firm* — NSIP Law

(57) ABSTRACT

Disclosed herein are a method and apparatus for encoding/decoding a deep learning network. According to an embodiment, the method for decoding a deep learning network may include decoding network header information regarding the deep learning network; decoding layer header information regarding a plurality of layers in the deep learning network; decoding layer data information regarding specific information of the plurality of layers; and obtaining the deep learning network and a plurality of layers in the deep learning network, and the layer header information includes layer distinction information associated with distinguishing the plurality of layers.

11 Claims, 8 Drawing Sheets

(56) References Cited

FOREIGN PATENT DOCUMENTS

KR  10-2018-0096779 A  8/2018
WO  WO 2017/151203 A1  9/2017

OTHER PUBLICATIONS

Carrillo, Snaider, et al. "Hierarchical network-on-chip and traffic compression for spiking neural network implementations." 2012 IEEE/ACM Sixth International Symposium on Networks-on-Chip. IEEE, 2012. (Year: 2012).*

Pal, Chandrajit, et al. "Modified Huffman based compression methodology for deep neural network implementation on resource constrained mobile platforms." *2018 IEEE International Symposium on Circuits and Systems (ISCAS)*. IEEE, May 27, 2018; pp. 1-5.

* cited by examiner

FIG. 4

| layer_parameter_set_rbsp() { | |
|---|---|
| layer_id | Layer id |
| layer_type | Layer type |
| layer_size | Layer size |
| quantization_parameter | Quantization parameter |
| save_activation_flag | Whether or not activation data is saved |
| differential_coding | Whether or not differential coding technique is used |
| if (differential_coding) | |
|    Prev_layer_id | Previous layer id |
| sub_layer_flag | Whether or not there is a sub-layer |
| if (sub_layer_flag) { | |
|    use_layer_info_flag | Whether or not layer information is used |

FIG. 5

| sub_layer_parameter_set_rbsp() { | |
|---|---|
| sub_layer_id | Sub-layer id |
| if (!use_layer_info) { | |
| num_col_in_tile | Number of columns in tile |
| num_row_in_tile | Number of rows in tile |
| num_chn_in_tile | Number of channels in tile |
| } | |
| } | |

FIG. 6

| | |
|---|---|
| num_tile_col | Number of tile partitions (column-wise) |
| num_tile_row | Number of tile partitions (row-wise) |
| num_tile_chn | Number of tile partitions (channel-wise) |
| uniform_spacing_flag | Whether or not tile is equally partitioned |
| if (uniform_spacing_flag) { | |
| for(i=0; i<num_tile_col; i++) | |
| col_width[i] | Column-wise size of each tile |
| for(i=0; i<num_tile_row; i++) | |
| row_width[i] | Row-wise size of each tile |
| for(i=0; i<num_tile_chn; i++) | |
| chn_width[i] | Channel-wise size of each tile |
| } | |
| num_tiles | Total number of tiles |
| if (num_tiles) { | |
| offset_len | First position of tile (in byte) |
| for(i=0; i<num_tiles; i++) | |
| entry_point_offset[i] | Next position of tile (in byte) |
| } | |
| } | |
| } | |

Compressed bitstream   0000000010111... (Octal number)
                                  Inserted
Converted bitstream    000000030́10111... (Octal number)

METHOD AND APPARATUS FOR ENCODING/DECODING DEEP LEARNING NETWORK

CROSS REFERENCE TO RELATED APPLICATIONS

This application is a U.S. National Stage Application of International Application No. PCT/KR2020/017270 filed Nov. 30, 2020, which claims priority to KR application 10-2019-0164757 filed Dec. 11, 2019, in the Korean Intellectual Property Office, the entire disclosure of which is incorporated herein by reference for all purposes.

BACKGROUND OF THE INVENTION

Field of the Invention

The present disclosure relates to a method and apparatus for encoding/decoding a deep learning network, and more particularly, to a method and apparatus for encoding/decoding a deep learning network by using information for distinguishing a plurality of layers in the deep learning network, network information, layer header information, sub-layer header information and the like.

Description of the Related Art

Deep learning techniques are showing encouraging performance, surpassing existing traditional methods in various application fields such as image recognition, voice signal processing, and natural language processing. The deep learning technique trains a network model composed of weights and biases for a given application field and then applies the learned network model to the application field again to improve its performance A deep learning network model is a set of weights and biases performed between layers of a network, and a size of a model in a layer become different according to layer types (input/output/convolutional/residual/fully-connected/recurrent/batch normalization). In the case of a AlexNet network, a size of a deep learning network model is 240 MB, and in the case of a VGG-16 network, it is as large as 552 MB, and since these models are too large to store in an internal SRAM (Cache), they need to be stored in a large-capacity external memory (DRAM).

When a network model is frequently imported from DRAM for the purpose of deep learning computation, power consumption (energy consumption of 640 pJ for 32-bit DRAM access in a 45 nm CMOS process) results in a waste of energy. Accordingly, if a deep learning network model is stored by being compressed, the model size is reduced so that the access rate of DRAM can decrease, which can bring a great advantage in power efficiency.

However, when a deep learning network is compressed, a deep learning network model is not processed with layer units being distinguished, but a method of compressing the whole model at once is used. That is, no factor for distinguishing layers is included in a bitstream of a compressed deep learning network model. Therefore, the problem of inefficiency is present since the whole deep learning network model compressed and stored in an external memory should be imported and decoded whenever every layer is processed.

SUMMARY

An object of the present disclosure is to provide a method and apparatus for encoding/decoding a deep learning network.

Another object of the present disclosure is to provide a method and apparatus for encoding/decoding a deep learning network in layer units.

Another object of the present disclosure is to provide a method and apparatus for encoding/decoding a deep learning network by using network header information, layer header information and sub-layer header information.

Another object of the present disclosure is to provide a method and apparatus for encoding/decoding a deep learning network by using information for distinguishing layers.

Another object of the present disclosure is to provide a method and apparatus for efficiently encoding/decoding a deep learning network.

Other objects and advantages of the present disclosure will become apparent from the description below and will be clearly understood through embodiments of the present disclosure. It is also to be easily understood that the objects and advantages of the present disclosure may be realized by means of the appended claims and a combination thereof.

According to the present disclosure, a method for encoding a deep learning network may be provided, including: generating network header information regarding the deep learning network; generating layer header information regarding a plurality of layers in the deep learning network; generating layer data information regarding specific information of the plurality of layers; and generating a bitstream including the network header information, the layer header information and the layer data information, and the layer header information includes layer distinction information associated with distinguishing the plurality of layers.

The network header information may include at least one of network type information regarding a type of the deep learning network, network name information regarding a name of the deep learning network, and network layer number information regarding a number of layers in the deep learning network.

The layer header information may include at least one of layer ID information regarding ID of the plurality of layers, layer type information regarding a type of the plurality of layers, layer size information regarding a layer size of the plurality of layers, quantization parameter information regarding a quantization parameter, activation data information regarding activation data passing through the plurality of layers, differential coding technique usage information regarding whether or not a differential coding technique is used, previous layer ID information regarding a previous layer ID, and sub-layer presence information regarding whether or not a sub-layer is present.

The layer data information may include sub-layer header information associated with tile information included in the plurality of layers and sub-layer data information associated with specific information of a tile included in the plurality of layers.

The sub-layer header information may include at least one of tile partitioning information associated with partitioning of a tile in the plurality of layers, equal partitioning information regarding whether or not the tile is equally partitioned, tile size information regarding a size of the tile, tile number information regarding a number of the tile, and tile position information regarding a position of the tile.

The sub-layer header information may include at least one of in-tile row number information regarding a number of rows in a tile included in the plurality of layers, in-tile column number information regarding a number of columns in the tile, and in-tile channel number information regarding a number of channels in the tile.

The tile partitioning information may include at least one of row-wise tile partition number information regarding row-wise partitioning of the tile, column-wise tile partition number information regarding column-wise partitioning of the tile, and channel-wise tile partition number information regarding channel-wise partitioning of the tile.

The tile size information may include at least one of row-wise tile size information regarding a row-wise size of the tile, column-wise tile size information regarding a column-wise size of the tile, and channel-wise tile size information regarding a channel-wise size of the tile.

The tile position information may include at least one of first position tile information regarding a first position of the tile and next position tile information regarding a next position of the tile.

A bit string of the network header information and a bit string of the layer data information may be converted so that the layer distinction information is included only in the layer header information.

A method for decoding a deep learning network may be provided, including: decoding network header information regarding the deep learning network; decoding layer header information regarding a plurality of layers in the deep learning network; decoding layer data information regarding specific information of the plurality of layers; and obtaining the deep learning network and a plurality of layers in the deep learning network, and the layer header information includes layer distinction information associated with distinguishing the plurality of layers.

The network header information may include at least one of network type information regarding a type of the deep learning network, network name information regarding a name of the deep learning network, and network layer number information regarding a number of layers in the deep learning network.

The layer header information may include at least one of layer ID information regarding ID of the plurality of layers, layer type information regarding a type of the plurality of layers, layer size information regarding a layer size of the plurality of layers, quantization parameter information regarding a quantization parameter, activation data information regarding activation data passing through the plurality of layers, differential coding technique usage information regarding whether or not a differential coding technique is used, previous layer ID information regarding a previous layer ID, and sub-layer presence information regarding whether or not a sub-layer is present.

The layer data information may include sub-layer header information associated with tile information included in the plurality of layers and sub-layer data information associated with specific information of a tile included in the plurality of layers.

The sub-layer header information may include at least one of tile partitioning information associated with partitioning of a tile in the plurality of layers, equal partitioning information regarding whether or not the tile is equally partitioned, tile size information regarding a size of the tile, tile number information regarding a number of the tile, and tile position information regarding a position of the tile.

The sub-layer header information may include at least one of in-tile row number information regarding a number of rows in a tile included in the plurality of layers, in-tile column number information regarding a number of columns in the tile, and in-tile channel number information regarding a number of channels in the tile.

The tile partitioning information may include at least one of row-wise tile partition number information regarding row-wise partitioning of the tile, column-wise tile partition number information regarding column-wise partitioning of the tile, and channel-wise tile partition number information regarding channel-wise partitioning of the tile.

The tile size information may include at least one of row-wise tile size information regarding a row-wise size of the tile, column-wise tile size information regarding a column-wise size of the tile, and channel-wise tile size information regarding a channel-wise size of the tile.

The tile position information may include at least one of first position tile information regarding a first position of the tile and next position tile information regarding a next position of the tile.

A computer-readable recording medium storing a bitstream, which is received and decoded by an image decoding apparatus and is used to reconstruct an image, may be provided, wherein the bitstream includes network header information regarding a deep learning network, layer header information regarding a plurality of layers in the deep learning network, and layer data information regarding specific information of the plurality of layers, and the layer header information includes layer distinction information associated with distinguishing the plurality of layers.

According to the present disclosure, a method and apparatus for encoding/decoding a deep learning network may be provided.

Also, according to the present disclosure, a method and apparatus for encoding/decoding a deep learning network in layer units may be provided.

Also, according to the present disclosure, a method and apparatus for encoding/decoding a deep learning network by using network header information, layer header information and sub-layer header information may be provided.

Also, according to the present disclosure, a method and apparatus for encoding/decoding a deep learning network by using information for distinguishing layers may be provided.

Also, according to the present disclosure, a method and apparatus for efficiently encoding/decoding a deep learning network may be provided.

BRIEF DESCRIPTION OF THE DRAWINGS

FIG. 4 illustrates layer header information according to an embodiment of the present disclosure.

FIG. 5 illustrates information on the number of tiles in sub-layer header information according to an embodiment of the present disclosure.

FIG. 6 illustrates tile partitioning information, tile size information and tile position information in sub-layer header information according to an embodiment of the present disclosure.

DETAILED DESCRIPTION

Figure 1:
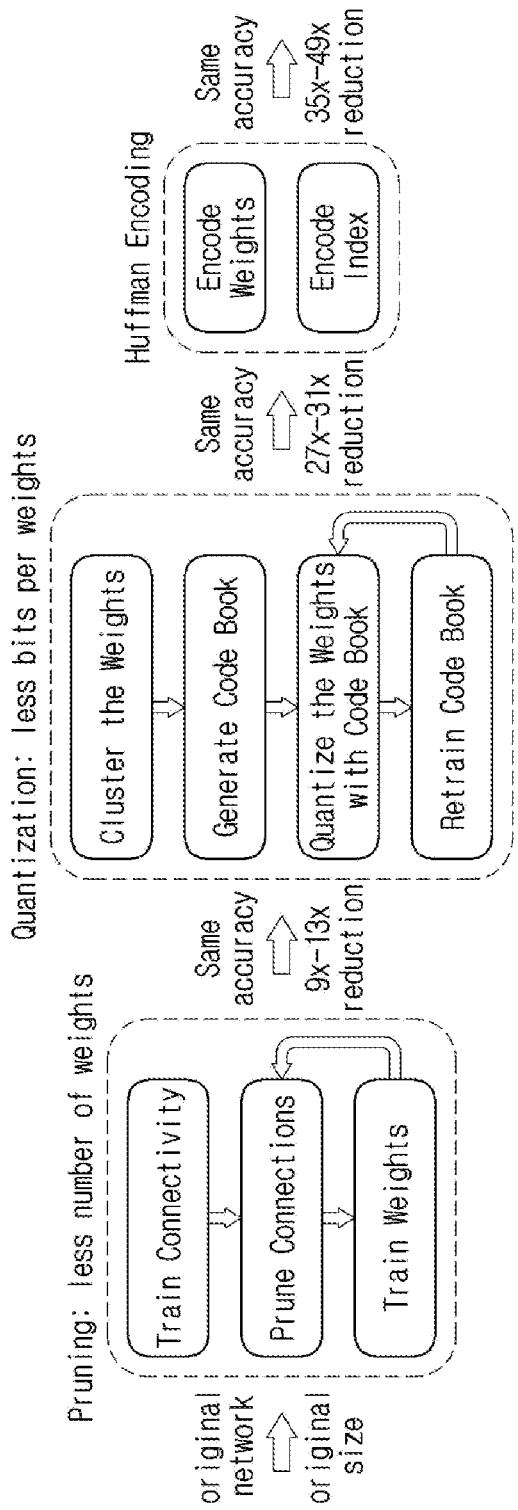
FIG. 1 illustrates a process of compressing a general deep learning network.

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

Terms used in the present disclosure, 'first', 'second', etc. may be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of relevant items or any one of a plurality of relevant terms.

When an element is simply referred to as being 'connected to' or 'coupled to' another element in the present disclosure, it should be understood that the former element is directly connected to or directly coupled to the latter element or the former element is connected to or coupled to the latter element, having yet another element intervening therebetween. In contrast, it should be understood that when an element is referred to as being "directly coupled" or "directly connected" to another element, there are no intervening elements present.

As constitutional parts shown in the embodiments of the present disclosure are independently shown so as to represent characteristic functions different from each other, it does not mean that each constitutional part is a constitutional unit of separated hardware or software. In other words, each constitutional part includes each of enumerated constitutional parts for better understanding and ease of description. Thus, at least two constitutional parts of each constitutional part may be combined to form one constitutional part or one constitutional part may be divided into a plurality of constitutional parts to perform each function. Both an embodiment where each constitutional part is combined and another embodiment where one constitutional part is divided are also included in the scope of the present disclosure, if not departing from the essence of the present disclosure.

The terms used in the present disclosure are merely used to describe particular embodiments, while not being intended to limit the present disclosure. Singular expressions include plural expressions unless the context clearly indicates otherwise. In the present disclosure, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific configuration is referred to as being "included", other configurations than the configuration are not excluded, but additional elements may be included in the embodiments of the present disclosure or the technical scope of the present disclosure.

In addition, some of constituents may not be indispensable constituents performing essential functions of the present disclosure but be selective constituents improving only performance thereof. The present disclosure may be implemented by including only the indispensable constitutional parts for realizing the essence of the present disclosure except other constituents used merely for improving performance. A structure including only the indispensable constituents except the selective constituents used only for improving performance is also included in the scope of right of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present invention. The same constituent elements in the drawings are denoted by the same reference numerals, and a repeated description of the same elements will be omitted.

FIG. 1 illustrates a process of compressing a general deep learning network. In a VGG-16 network, a compression technology for a representative deep learning network model may achieve about 49 times improvement in compression performance through a pruning-quantization-Huffman encoding process.

Referring to FIG. 1, in a pruning-quantization-Huffman encoding process, a pruning technique may cut a connection between neurons on the ground that a value with a sufficiently small weight in a model contributes little to performance The weight may set to 0. In addition, the pruning technique may remove an unnecessary weight, while maintaining performance through a relearning process.

A quantization technique may derive an optimal quantization code book for quantizing a weight in a layer through a learning process. A Huffman encoding technique may correspond to a process of converting quantized weights and code book to a bitstream. The above process may yield about 20 to 30 percent additional compression.

Figure 2:
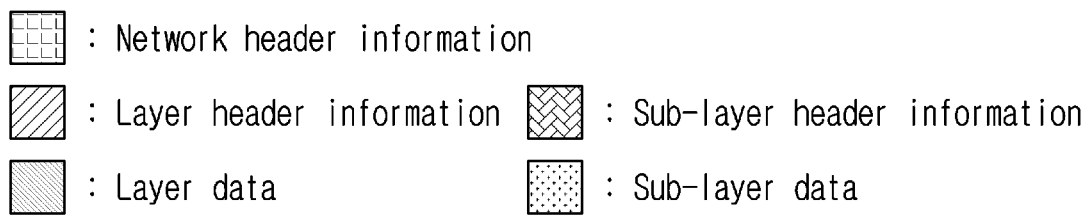
FIG. 2 illustrates a bitstream structure compressing a deep learning network according to an embodiment of the present disclosure.

FIG. 2 illustrates a bitstream structure compressing a deep learning network according to an embodiment of the present disclosure. A deep learning network model may be compressed into a bitstream through an encoding process. The bitstream may be compressed in a layer unit included in the deep learning network model.

Referring to FIG. 2, a bitstream, into which a deep learning network, may include network header information, 0 to N layer header information, and 0 to N layer dater information. In addition, each piece of layer data information may include multiple pieces of sub-layer header information and multiple pieces of sub-layer data information. In addition, layer data and sub-layer data may be compressed by the pruning-quantization-Huffman encoding process described in FIG. 1.

Figure 3:
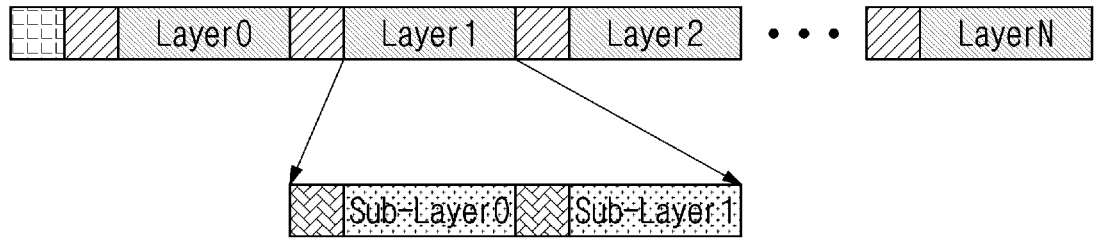
FIG. 3 illustrates network header information according to an embodiment of the present disclosure.

FIG. 3 illustrates network header information according to an embodiment of the present disclosure. Network header information may include information on a type of a deep learning network, information on a name of a deep learning network, and information on a total number of layers in the deep learning network.

Referring to FIG. 3, network header information (e.g., network_parameter_set_rbsp) may be signaled. In addition, information indicating a network type (e.g., network_type), information indicating a network name (e.g., network_name) and information indicating a total number of layers in a network (e.g., num_layers), which are included in network header information, may be signaled.

FIG. 4 illustrates layer header information according to an embodiment of the present disclosure. Layer header information may include information on a layer ID, information on a layer type, information on a layer size, information regarding whether or not activation data is saved, information regarding whether or not a sub-layer is present, and information regarding whether or not layer information is used.

Referring to FIG. 4, layer header information (e.g., layer_parameter_set_rbsp) may be signaled. In addition, information indicating a layer ID (e.g., layer_id), information indicating a layer type (e.g., layer_type), information indicating a layer size (e.g., layer_size), and information indicating a quantization parameter (e.g., quantization_parameter), which are included in layer header information, may be signaled. In addition, information indicating whether or not activation data is saved (e.g., save_activation_flag), information indicating whether or not a differential coding technique is used (e.g., differential_coding), information indicating a previous layer ID (e.g., prev_layer_id), information indicating whether or not a sub-layer is present (e.g., sub_layer_flag), and information indicating whether or not layer information is used (e.g., use_layer_info_flag), which are included in layer header information, may be signaled.

FIG. 5 illustrates information on the number of tiles in sub-layer header information according to an embodiment of the present disclosure. Sub-layer header information may include information on a sub-layer ID and information on the number of tiles in a layer of a deep learning network model.

Referring to FIG. 5, sub-layer header information (e.g., sub_layer_parameter_set_rbsp) may be signaled. In addition, information on a sub-layer ID (e.g., sub_layer_id), which is included in sub-layer header information, may be signaled. In addition, information indicating the number of columns in a tile (e.g., num_col_in_tile), information indicating the number of rows in a tile (e.g., num_row_in_tile), and information indicating the number of channels in a tile (e.g., num_chn_in_tile), which are included in sub-layer header information, may be signaled.

FIG. 6 illustrates tile partitioning information, tile size information and tile position information in sub-layer header information according to an embodiment of the present disclosure. Sub-layer header information may include information on partitioning of a tile in a layer of a deep learning network model, information on a size of the tile, and information on a position of the tile.

Referring to FIG. 6, information indicating the number of column-wise partitions of a tile (e.g., num_tile_col), information indicating the number of row-wise partitions of a tile (e.g., num_tile_row), and information indicating the number of channel-wise partitions of a tile (e.g., num_tile_chn), which are included in sub-layer header information, may be signaled. In addition, information indicating whether or not a tile is uniformly partitioned (e.g., uniform_spacing_flag), which is included in sub-layer header information, may be signaled.

In addition, information indicating a column-wise size of each tile (e.g., col_width[i]), information indicating a row-wise size of each tile (e.g., row_width[i]) and information indicating a channel-wise size of each tile (e.g., chn_width[i]), which are included in sub-layer header information, may be signaled.

In addition, information indicating a total number of tiles (e.g., num_tiles), information indicating a first position of a tile (e.g., offset_len), and information indicating a next position of the tile (e.g., entry_point_offset[i]), which are included in sub-layer header information, may be signaled.

Figure 7:
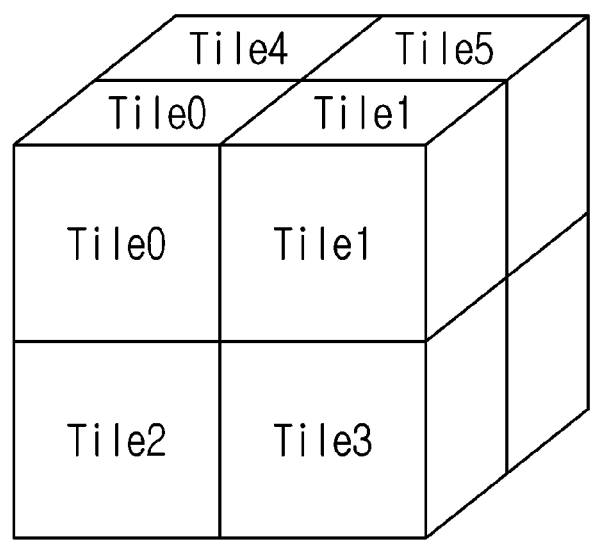
FIG. 7 illustrates a tile structure of a layer included in a deep learning network according to an embodiment of the present disclosure.

FIG. 7 illustrates a tile structure of a layer included in a deep learning network according to an embodiment of the present disclosure.

Referring to FIG. 7, one layer in a deep learning network may partitioned into 8 tiles. Accordingly, information indicating a total number of tiles (e.g., num_tiles) may correspond to 8. According to a size of each tile, information indicating a column-wise size of each tile (e.g., col_width[i]), information indicating a row-wise size of each tile (e.g., row_width[i]) and information indicating a channel-wise size of each tile (e.g., chn_width[i]) may be determined. In addition, when each tile is uniformly partitioned, information indicating whether or not a tile is uniformly partitioned (e.g., uniform_spacing_flag) may correspond to 1. However, a structure of a tile included in a layer is not limited to the above-described embodiment.

Figures 8, 9:
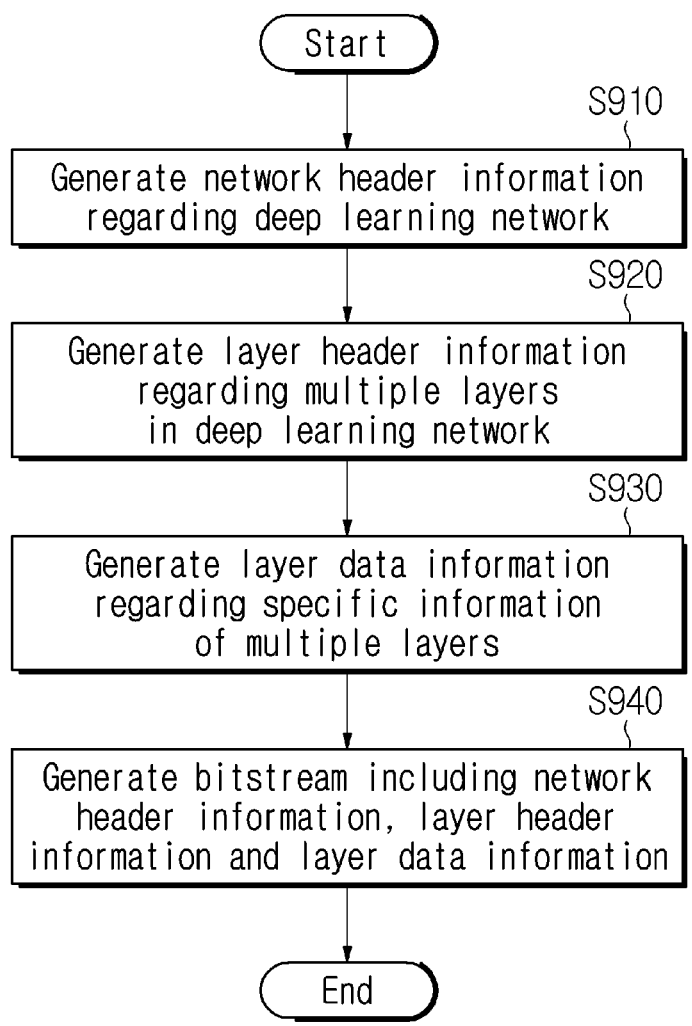
FIG. 8 illustrates a process of converting a bitstream compressing a deep learning network according to an embodiment of the present disclosure.
FIG. 9 illustrates a flowchart of a method for encoding a deep learning network according to an embodiment of the present disclosure.

FIG. 8 illustrates a process of converting a bitstream compressing a deep learning network according to an embodiment of the present disclosure. A layer header may include information for distinguishing layers. In a video compression standard like H.264/HEVC, a syntax for distinguishing layers may be defined as Start Code Prefix. In a video compression standard, the start of one frame or slice may be distinguished in a bitstream by using Start Code Prefix.

Referring to FIG. 8, information indicating layer distinction (e.g., 32-bit 0x00000001) included in layer header information may be signaled. In a bitstream that compresses a deep learning network model, when the information indicating the layer distinction (e.g., 32-bit 0x00000001) appears in a part apart from a layer header part, a layer cannot be distinguished. Accordingly, a bitstream needs to be converted so that the information indicating the layer distinction does not appear in a network header part and a layer data part.

As an example, when 0x3 is inserted into a bit string of a network header part and a layer data part, the information indicating the layer distinction may not appear. Thus, since the information indicating the layer distinction is present in a bit string 0000000010111 . . . (in a network header or layer data part) of a compressed bitstream, 0x3 may be inserted in the middle. A bitstream thus converted may be defined as a raw byte sequence payload (RBSP) before being converted into an encapsulated byte sequence payload (EBSP). After the conversion process, layer distinction information does not appear in a compressed bitstream (network header or layer data part) and thus the start of a layer may be always distinguished under that assumption that the bitstream is not damaged.

FIG. 9 illustrates a flowchart of a method for encoding a deep learning network according to an embodiment of the present disclosure.

Referring to FIG. 9, network header information regarding a deep learning network may be generated (S910).

According to an embodiment, network header information may include at least one of network type information regarding a type of a deep learning network, network name information regarding a name of the deep learning network, and network layer number information regarding a number of layers in the deep learning network.

In addition, layer header information regarding a plurality of layers in the deep learning network may be generated (S920).

According to an embodiment, layer header information may include at least one of layer ID information regarding ID of a plurality of layers, layer type information regarding a type of the plurality of layers, layer size information regarding a layer size of the plurality of layers, quantization parameter information regarding a quantization parameter, activation data information regarding activation data passing through the plurality of layers, differential coding technique usage information regarding whether or not a differential coding technique is used, previous layer ID information regarding a previous layer ID, and sub-layer presence information regarding whether or not a sub-layer is present.

In addition, layer data information regarding specific information of the plurality of layers may be generated (S930).

According to an embodiment, layer data information may include sub-layer header information associated with tile information included in a plurality of layers and sub-layer data information associated with specific information of a tile included in the plurality of layers.

According to an embodiment, sub-layer header information may include at least one of tile partitioning information associated with partitioning of a tile in a plurality of layers, equal partitioning information regarding whether or not the tile is equally partitioned, tile size information regarding a size of the tile, tile number information regarding a number of the tile, and tile position information regarding a position of the tile.

According to an embodiment, sub-layer header information may include at least one of in-tile row number information regarding a number of rows in a tile included in a plurality of layers, in-tile column number information regarding a number of columns in the tile, and in-tile channel number information regarding a number of channels in the tile.

According to an embodiment, tile partitioning information may include at least one of row-wise tile partition number information regarding row-wise partitioning of a tile, column-wise tile partition number information regarding column-wise partitioning of the tile, and channel-wise tile partition number information regarding channel-wise partitioning of the tile.

According to an embodiment, tile size information may include at least one of row-wise tile size information regarding a row-wise size of a tile, column-wise tile size information regarding a column-wise size of the tile, and channel-wise tile size information regarding a channel-wise size of the tile.

According to an embodiment, tile position information may include at least one of first position tile information regarding a first position of a tile and next position tile information regarding a next position of the tile.

In addition, a bitstream including network header information, layer header information and layer data information may be generated (S940).

According to an embodiment, a bit string of network header information and a bit string of layer data information may be converted so that layer distinction information is included only in layer header information.

Figure 10:
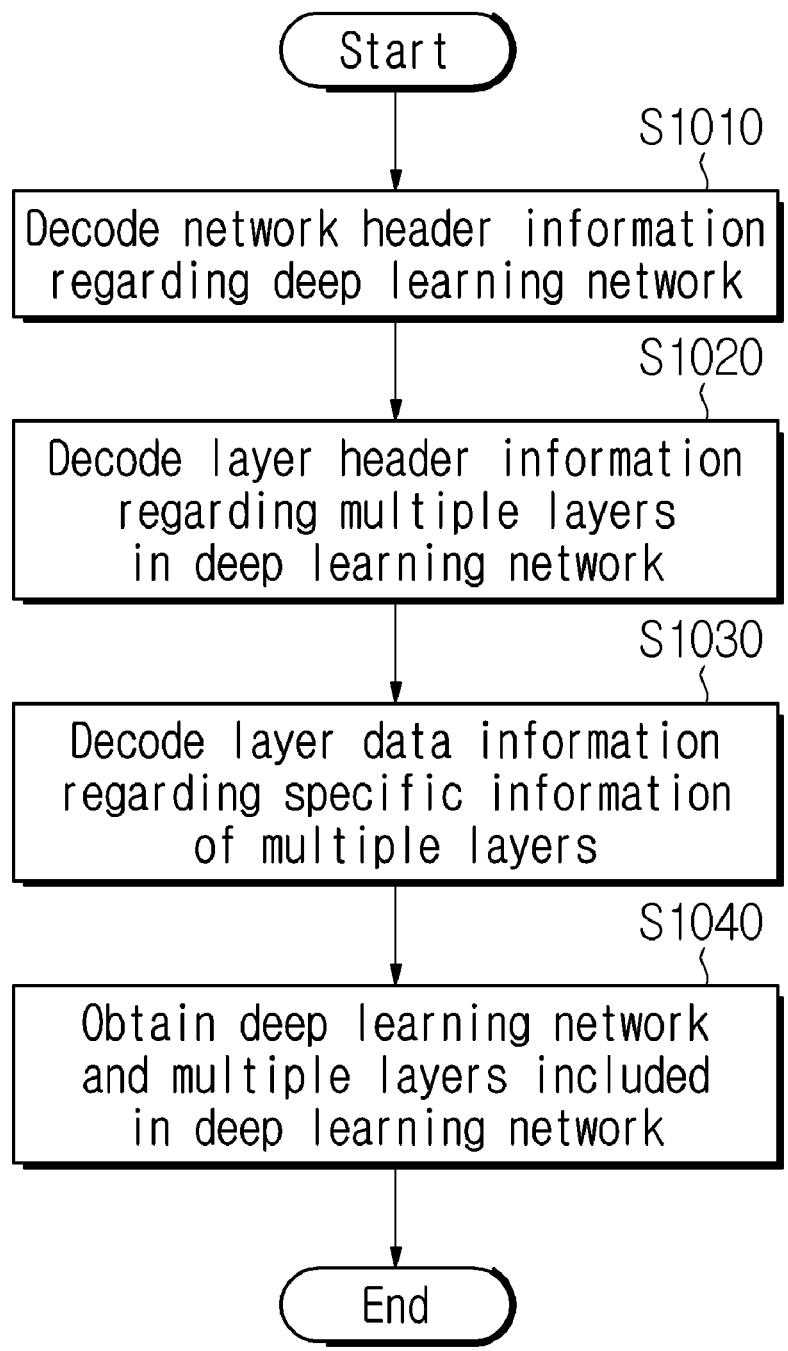
FIG. 10 illustrates a flowchart of a method for decoding a deep learning network according to an embodiment of the present disclosure.

FIG. 10 illustrates a flowchart of a method for decoding a deep learning network according to an embodiment of the present disclosure.

Referring to FIG. 10, network header information regarding a deep learning network may be decoded (S1010).

According to an embodiment, network header information may include at least one of network type information regarding a type of a deep learning network, network name information regarding a name of the deep learning network, and network layer number information regarding a number of layers in the deep learning network.

In addition, layer header information regarding a plurality of layers in a deep learning network may be decoded (S1020).

According to an embodiment, layer header information may include at least one of layer ID information regarding ID of a plurality of layers, layer type information regarding a type of the plurality of layers, layer size information regarding a layer size of the plurality of layers, quantization parameter information regarding a quantization parameter, activation data information regarding activation data passing through the plurality of layers, differential coding technique usage information regarding whether or not a differential coding technique is used, previous layer ID information regarding a previous layer ID, and sub-layer presence information regarding whether or not a sub-layer is present.

In addition, layer data information regarding specific information of the plurality of layers may be decoded (S1030).

According to an embodiment, layer data information may include sub-layer header information associated with tile information included in the plurality of layers and sub-layer data information associated with specific information of a tile included in the plurality of layers.

According to an embodiment, sub-layer header information may include at least one of tile partitioning information associated with partitioning of a tile in a plurality of layers, equal partitioning information regarding whether or not the tile is equally partitioned, tile size information regarding a size of the tile, tile number information regarding a number of the tile, and tile position information regarding a position of the tile.

According to an embodiment, sub-layer header information may include at least one of in-tile row number information regarding a number of rows in a tile included in a plurality of layers, in-tile column number information regarding a number of columns in the tile, and in-tile channel number information regarding a number of channels in the tile.

According to an embodiment, tile partitioning information may include at least one of row-wise tile partition number information regarding row-wise partitioning of a tile, column-wise tile partition number information regarding column-wise partitioning of the tile, and channel-wise tile partition number information regarding channel-wise partitioning of the tile.

According to an embodiment, tile size information may include at least one of row-wise tile size information regarding a row-wise size of a tile, column-wise tile size information regarding a column-wise size of the tile, and channel-wise tile size information regarding a channel-wise size of the tile.

According to an embodiment, tile position information may include at least one of first position tile information regarding a first position of a tile and next position tile information regarding a next position of the tile.

In addition, the deep learning network and the plurality of layers in the deep learning network may be obtained (S1040).

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

What is claimed is:

1. A method for decoding a deep learning network, the method comprising:
   decoding network header information regarding the deep learning network;
   decoding layer header information regarding a plurality of layers in the deep learning network;
   decoding layer data information regarding specific information of the plurality of layers; and
   reconstructing the deep learning network and a plurality of layers in the deep learning network based on the decoded network header information, the decoded layer header information and the decoded layer data information,
   wherein the layer header information includes layer distinction information associated with distinguishing the plurality of layers,
   wherein the network header information includes network type information regarding a type of the deep learning network, network name information regarding a name of the deep learning network, and network layer number information regarding a number of layers in the deep learning network.

2. The method of claim 1, wherein the layer header information includes at least one of layer ID information regarding an ID of the plurality of layers, layer type information regarding a type of the plurality of layers, layer size information regarding a layer size of the plurality of layers, quantization parameter information regarding a quantization parameter, activation data information regarding activation data passing through the plurality of layers, differential coding technique usage information regarding whether or not a differential coding technique is used, previous layer ID information regarding a previous layer ID, and sub-layer presence information regarding whether or not a sub-layer is present.

3. The method of claim 1, wherein the layer data information includes sub-layer header information associated with tile information included in the plurality of layers and sub-layer data information associated with specific information of a tile included in the plurality of layers.

4. The method of claim 3, wherein the sub-layer header information includes at least one of tile partitioning information associated with partitioning of a tile in the plurality of layers, equal partitioning information regarding whether or not the tile is equally partitioned, tile size information regarding a size of the tile, tile number information regarding a number of the tile, and tile position information regarding a position of the tile.

5. The method of claim 4, wherein the tile partitioning information includes at least one of row-wise tile partition number information regarding row-wise partitioning of the tile, column-wise tile partition number information regarding column-wise partitioning of the tile, and channel-wise tile partition number information regarding channel-wise partitioning of the tile.

6. The method of claim 4, wherein the tile size information includes at least one of row-wise tile size information regarding a row-wise size of the tile, column-wise tile size information regarding a column-wise size of the tile, and channel-wise tile size information regarding a channel-wise size of the tile.

7. The method of claim 4, wherein the tile position information includes at least one of first position tile information regarding a first position of the tile and next position tile information regarding a next position of the tile.

8. The method of claim 3, wherein the sub-layer header information includes at least one of in-tile row number information regarding a number of rows in a tile included in the plurality of layers, in-tile column number information regarding a number of columns in the tile, and in-tile channel number information regarding a number of channels in the tile.

9. A method for encoding a deep learning network, the method comprising:
- generating network header information regarding the deep learning network;
- generating layer header information regarding a plurality of layers in the deep learning network;
- generating layer data information regarding specific information of the plurality of layers; and
- encoding the network header information, the layer header information and the layer data information to generate a bitstream,
- wherein the layer header information includes layer distinction information associated with distinguishing the plurality of layers, and
- wherein the network header information includes network type information regarding a type of the deep learning network, network name information regarding a name of the deep learning network, and network layer number information regarding a number of layers in the deep learning network.

10. The method of claim 9, wherein a bit string of the network header information and a bit string of the layer data information are converted so that the layer distinction information is included only in the layer header information.

11. A non-transitory computer-readable recording medium storing a bitstream, which is received and decoded by an image decoding apparatus and is used to reconstruct an image, wherein the bitstream comprises:
- network header information regarding a deep learning network;
- layer header information regarding a plurality of layers in the deep learning network; and
- layer data information regarding specific information of the plurality of layers, and
- wherein the layer header information includes layer distinction information associated with distinguishing the plurality of layers, and
- wherein the network header information includes network type information regarding a type of the deep learning network, network name information regarding a name of the deep learning network, and network layer number information regarding a number of layers in the deep learning network.

* * * * *